United States Patent

Leung et al.

[11] Patent Number: 5,877,963
[45] Date of Patent: Mar. 2, 1999

[54] INTELLIGENT DOCUMENT RECOGNITION AND HANDLING

[75] Inventors: Steve Ka Lai Leung, San Jose; Samuel S. Hahn, Saratoga; Jon R. Degenhardt, Mountain View; Andrew C. Segal, Los Altos, all of Calif.

[73] Assignee: Documagix, Incorporated, San Jose, Calif.

[21] Appl. No.: 805,515

[22] Filed: Feb. 26, 1997

Related U.S. Application Data

[63] Continuation of Ser. No. 337,643, Nov. 10, 1994, Pat. No. 5,642,288.
[51] Int. Cl.[6] .................................................. G06F 19/00
[52] U.S. Cl. .............................. 364/478.11; 364/478.07; 364/478.12; 382/112; 382/190
[58] Field of Search ........................ 364/478.12, 478.07; 382/112, 190, 209

[56] References Cited

U.S. PATENT DOCUMENTS

| | | | |
|---|---|---|---|
| 4,959,870 | 9/1990 | Tachikawa | 382/56 |
| 5,031,225 | 7/1991 | Tachikawa et al. | 382/21 |
| 5,408,336 | 4/1995 | Ishida | 358/447 |
| 5,438,628 | 8/1995 | Spitz et al. | 382/181 |

*Primary Examiner*—Paul P. Gordon
*Attorney, Agent, or Firm*—Townsend and Townsend and Crew LLP

[57] ABSTRACT

A method for handling of a document in a computer system, includes digitizing the document with the scanner to form a digitized image, determining a feature vector for the digitized image, comparing feature vectors of a plurality of previously stored images to the feature vector, returning a list of locations in the memory having at least one of the plurality of previously stored documents with a feature vector similar to the feature vector, and performing a task on the digitized image appropriate for documents in a selected location in the memory.

23 Claims, 14 Drawing Sheets

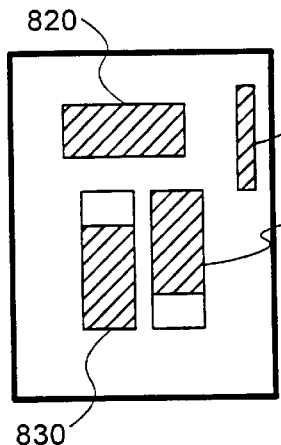
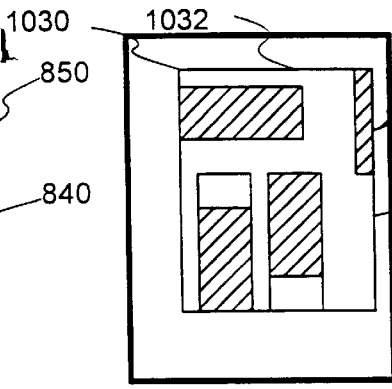
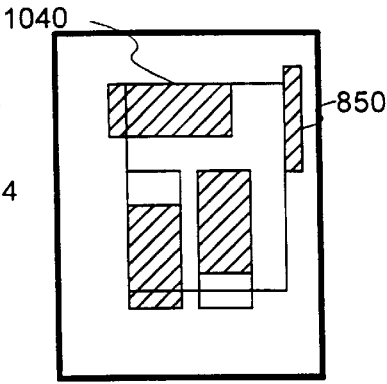
Fig. 11A    Fig. 11B    Fig. 11C
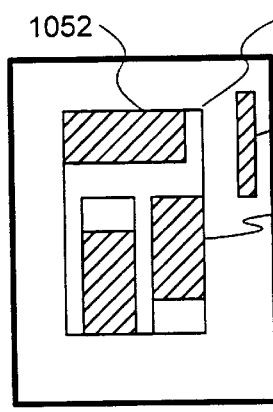
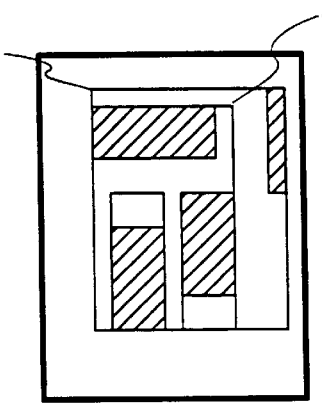
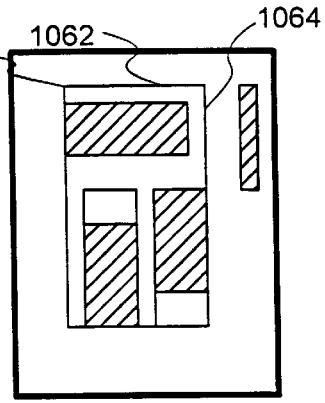
Fig. 11D    Fig. 11E    Fig. 11F
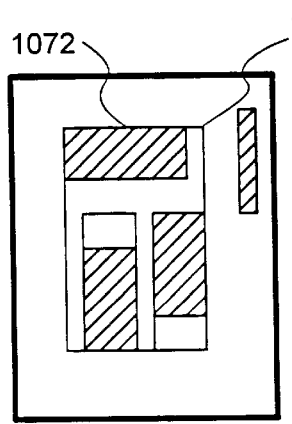
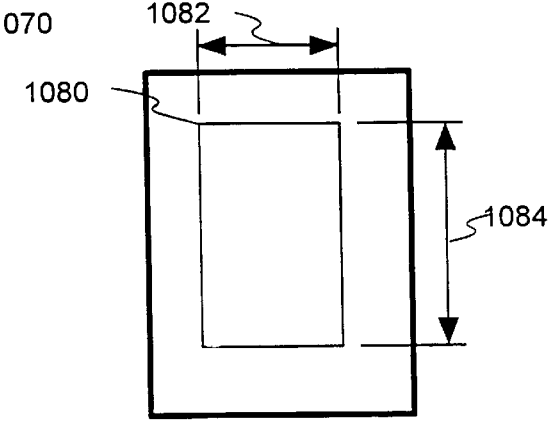
Fig. 11G    Fig. 11H

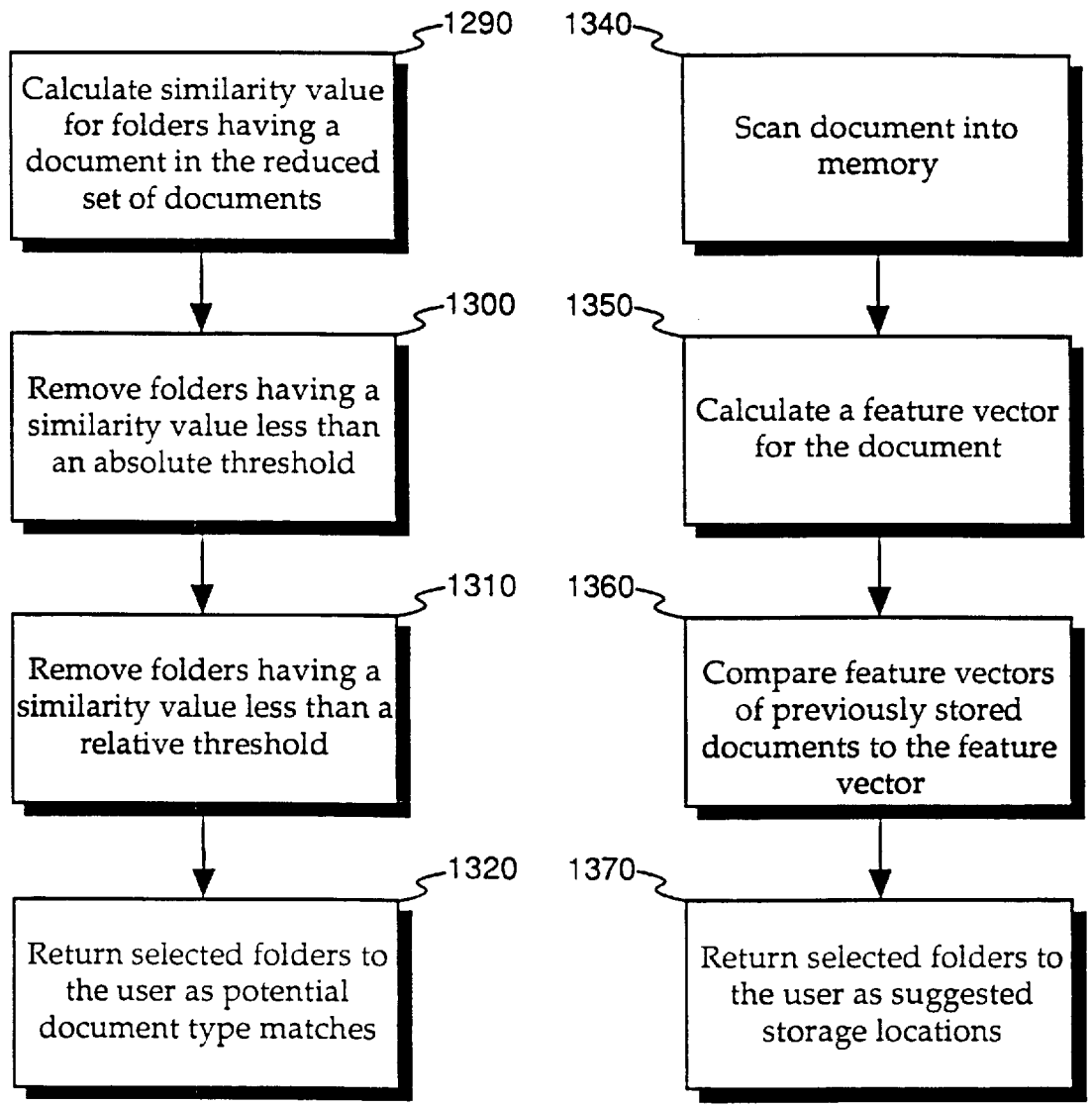

INTELLIGENT DOCUMENT RECOGNITION AND HANDLING

This is a Continuation of application Ser. No. 08/337,643 filed Nov. 10, 1994 the disclosure of which is incorporated by reference now U.S. Pat. No. 5,642,288.

BACKGROUND OF THE INVENTION

The present invention relates generally to intelligent document recognition and handling. Specifically, the invention relates to using image processing techniques to automatically determine a task to be performed for an electronic document in a computer. More specifically, the invention relates to using image processing techniques to automatically determine a document type and a filing location for an electronic document in a computer.

Electronic documents are documents that are created and saved on a computer or are printed documents that have been digitized or scanned into a computer. A user who relies upon electronically stored documents has the same challenge as one who relies upon printed documents in that knowing where documents are kept is as important as having copies of the documents in the first place.

When storing a printed document in a filing cabinet, a user typically first determines the type of document it is or what the subject matter of document is, and then determines the proper storage location for the document. When a user decides that there are several possible storage locations for that document, a user typically picks the "best" location for the document or otherwise makes copies of the document for each possible location. A drawback with saving only one copy in one location is that when another user attempts to locate that document that person might not look in the same location. A drawback with making copies for the several possible locations is the extra cost of making copies and of extra storage space.

Electronic documents share the same problems as printed documents as described above: one person's decision about where to store a document may change over time and is often different from a second person's decision. If a user stores only one electronic copy of a document, that document might be "lost" to the second person. Although storage and copy costs for electronic documents are minimal, a drawback to making duplicate electronic copies for the several possible locations is that any annotations, notes, or subsequent corrections made onto one copy typically are not carried over onto duplicate copies. A second person thus may not see, a "credit hold" note appended to one copy of the document, for example.

One method of helping users locate electronic documents has been to enable users to store document information in a summary sheet appended to a document. Such a feature is now common in many word processing programs. For example, a user can store his name, information about the document type, and other "keywords" related to the document in a cover sheet attached to the document. If a user subsequently needs to access a particular document, the user can search "keywords" or other information on existing documents' cover sheets to locate the document. A drawback to this approach is that a user may choose different "keywords" over time to identify the same subject matter, i.e. use "keywords" inconsistently. Further, in a multiple user system, different users will likely choose different "keywords" to identify the same subject matter. The result in a multiple user system is that documents and files might again become "lost" to subsequent users.

Another well known method developed to help users organize files is to provide a rigid directory and subdirectory structure. With a rigid directory structure, related files are stored according to a planned filing scheme. A problem with this method, however, is similar to the problem described above. Different users will decide that there are different "correct" locations in which to file a document. Further, this approach requires the user to remember the entire directory structure to determine where to store and retrieve documents.

SUMMARY OF THE INVENTION

The present invention provides a simple, yet efficient solution to the problem of electronic document management and handling. Specifically, the present invention provides a method of automatic recognition and filing of documents of a repeating nature.

According to a preferred embodiment of the invention, a method for handling of a document in a computer system includes the steps of digitizing the document with the scanner to form a digitized image; determining a feature vector for the digitized image with the processor; comparing feature vectors of a plurality of previously stored images to the feature vector; returning a list of filing locations in the memory having at least one of the plurality of previously stored documents with a feature vector similar to the feature vector; and executing a task on the digitized image appropriate for documents in a selected location in the memory.

According to another preferred embodiment of the invention, a method for filing a document in a computer system includes the steps of capturing the document with an input device; determining a position, a size, and a density for each of a plurality of regions in the document; determining a position and a size for a bounding region for the plurality of regions; forming a feature vector for the document from (i) the size of the bounding region, and (ii) the position, the size, and the density for each of the plurality of regions; comparing feature vectors of a plurality of previously stored documents in the memory to the feature vector; and storing the document in a selected location in memory.

Further understanding of the nature and advantages of the invention may be realized by reference to the remaining portions of the specification and drawings. In the drawings, similarly numbered items represent the same or functionally equivalent structure.

BRIEF DESCRIPTION OF THE DRAWINGS

FIGS. 11A–11H illustrate an example of the preferred process of determining a bounding rectangle for the rectangles in FIG. 8;

FIG. 16 is an expanded flow diagram illustration of the steps within the step of returning a list of potential document type matches; and FIG. 17 is a flow diagram illustrating a method of locating a previously stored document.

DESCRIPTION OF THE PREFERRED EMBODIMENT

Figure 1:
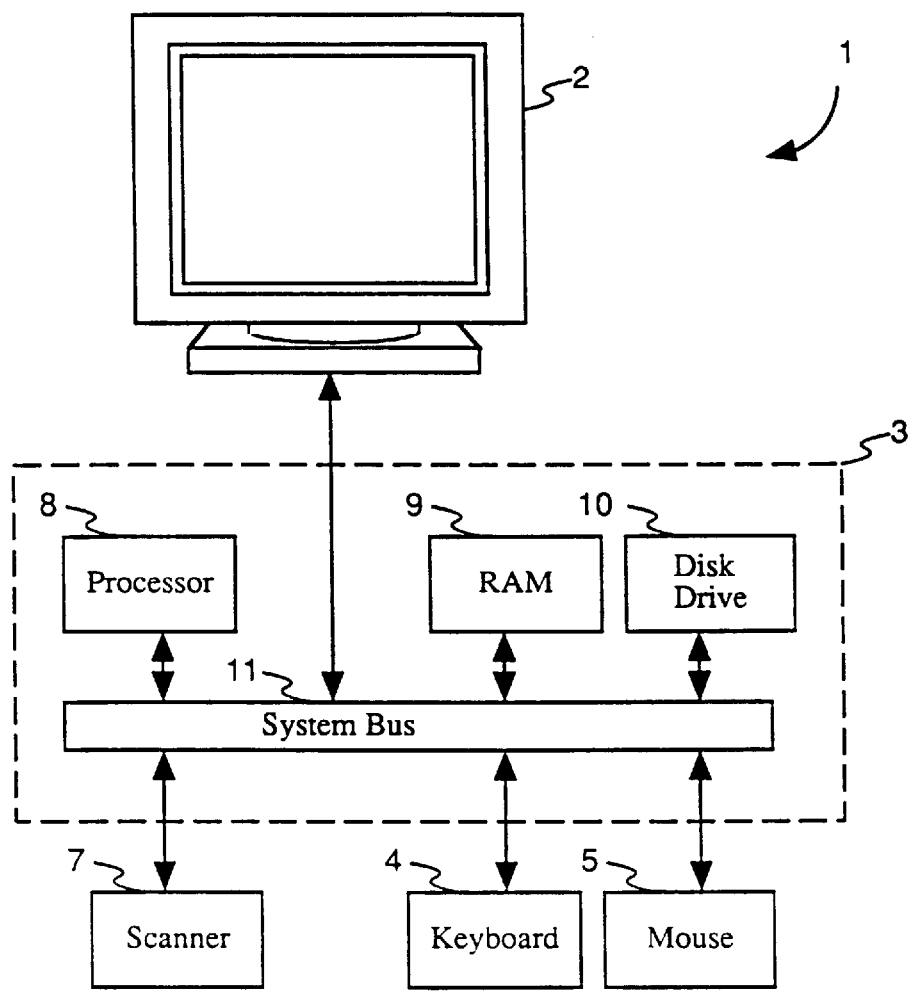
FIG. 1 is a block diagram of a system according to a preferred embodiment of the present invention.

FIG. 1 is a block diagram of a system 1 according to a preferred embodiment of the present invention. System 1 includes a display monitor 2, a computer 3, a keyboard 4, a mouse 5, and a digitizing scanner 7. Computer 3 includes familiar computer components such as a processor 8, memory storage devices, e.g., memory 9 and disk drive 10, and a system bus 11 interconnecting the above components. FIG. 1 is representative of but one type of system for embodying the present invention. It will be readily apparent to one of ordinary skill in the art that many types of systems and configurations are suitable for use in conjunction with the present invention.

Figure 2:
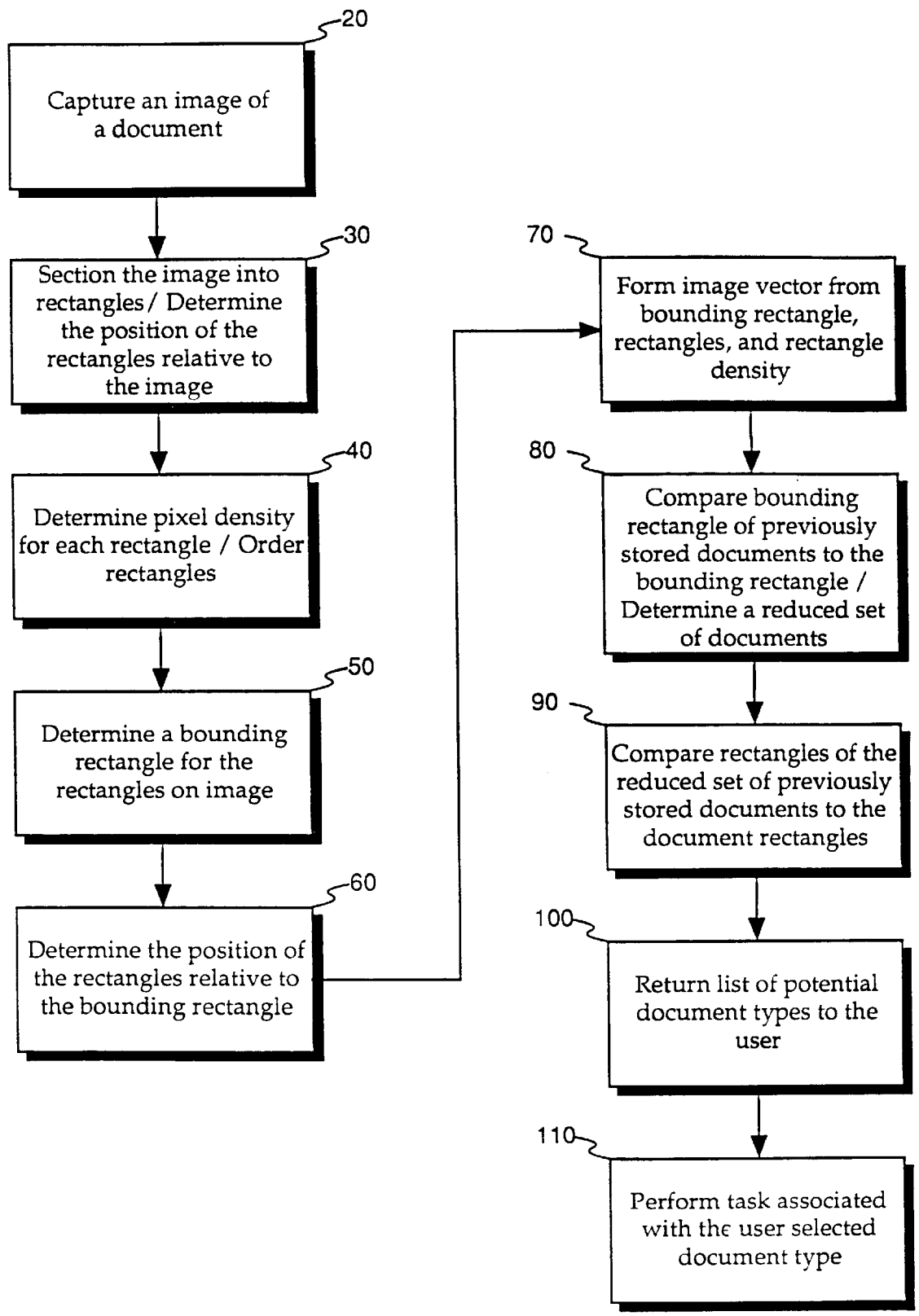
FIG. 2 is an overview flow diagram of a preferred method for intelligent document recognition and storage.

FIG. 2 is a flow diagram of a preferred method for intelligent document recognition and storage. The steps of FIG. 2 are described in conjunction with FIG. 1. Broadly speaking the method of our invention relies upon the calculation of features on a document to describe the document. A list of features of a document is also known as a feature vector. A user first captures an image of a document typically with a scanner 7 (FIG. 1) and stores the image into memory 9 (step 20). Alternatively, a user may retrieve an image of a document from disk drive 10. The document is preferably digitized into black and white pixels, although gray scale can also be used, and digitized to a resolution of 300 dots-per-inch (DPI), although any desired resolution can be used. Processor 8 sections the image into regions of a desired unit, preferably rectangles, and determines the position of the rectangles relative to the captured image (step 30). Rectangles are areas on the image which contain relatively contiguous areas of active pixels, preferably black pixels. Next, processor 8 determines a pixel density for each of the rectangles, and orders the rectangles by location on the image (step 40). From these rectangles, a bounding rectangle of a desired unit, preferably a rectangle is defined on the image which roughly bounds all the rectangles on the image (step 50). Once the bounding rectangle is defined, processor 8 determines the position of the rectangles relative to the bounding rectangle (step 60). Using this information processor 8 then forms a "feature vector" for the image based upon the location and size of the bounding rectangle, and the location, size, and pixel density of the remaining rectangles (step 70). Once a feature vector of the document has been calculated, it can be compared to previously stored document feature vectors.

Although it is possible to immediately compare all elements of a feature vector to the all elements of previously stored document feature vectors, such a task can require excessive processing time. To reduce processing time, in the preferred embodiment a two step comparison process as shown in FIG. 2 is used: steps 80 and 90. Processor 8 first compares bounding rectangles of documents previously stored in the system with the size of the bounding rectangles of the document. Based upon a pre-defined degree of matching, documents which match form a reduced set of documents (step 80). Next, processor 8 compares the rectangles in each of the reduced set of documents to the rectangles of the document to determine the number of matches between the respective rectangles (step 90). Based upon the number of relative matches of the document to documents stored in particular filing location, processor 8 returns an ordered list of potential matches to the user (step 100). In a preferred embodiment, each particular filing location is characterized by a "document type." The user selects a particular document type for the document, preferably from the ordered list of potential matches, and then processor 8 performs a task associated with the particular document type (step 110).

Figure 3:
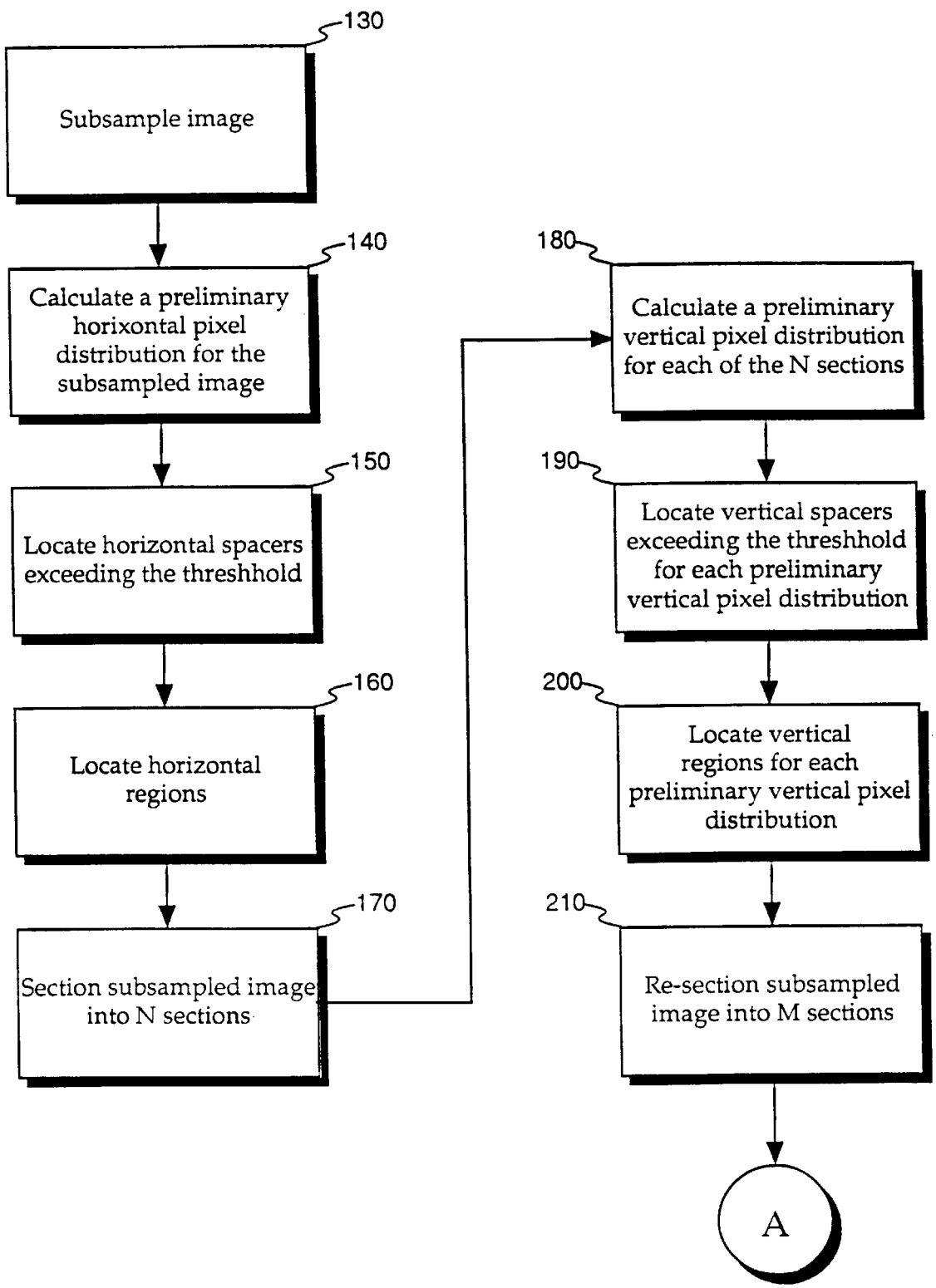
FIGS. 3 and 4 are an expanded flow diagram illustrating the steps within the step of sectioning the image into rectangles.
Figure 4:
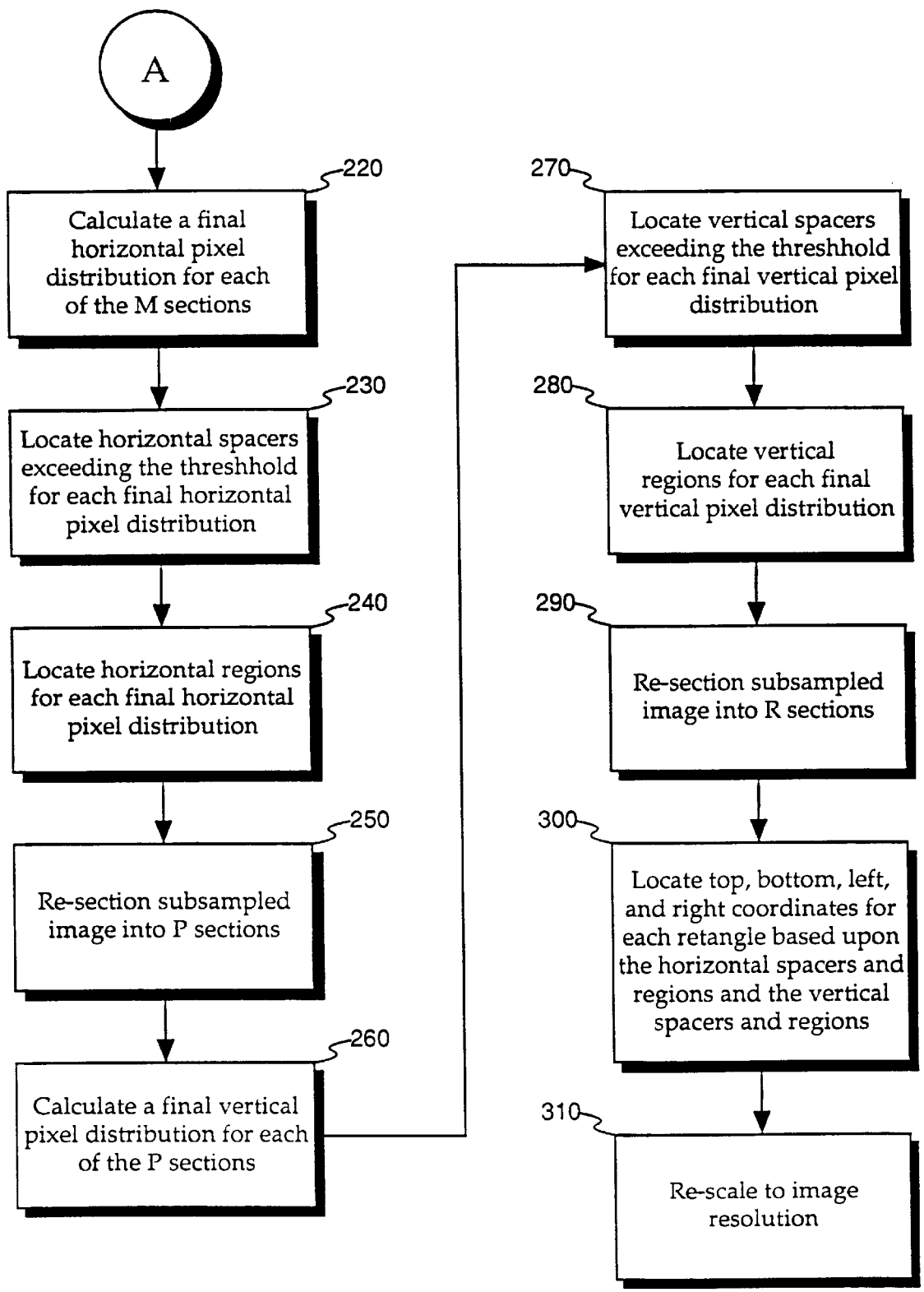

FIGS. 3 and 4 are an expanded flow diagram illustrating the steps within step 30 (sectioning the image into rectangles). The scanned image is first subsampled, preferably to 50 DPI, to decrease the number of data points that need to be processed and to decrease the calculation time (step 130). Processor 8 next calculates a preliminary horizontal pixel distribution of the subsampled image (step 140). In a preferred embodiment, a horizontal pixel distribution is the sum of the number of active pixels in a horizontal row, and is repeated for each horizontal row in the subsampled image. Active pixels may be white pixels, or more preferably black pixels. The horizontal pixel distribution is preferably stored as the number of active pixels in a row as a function of the horizontal row number.

Based upon the preliminary horizontal pixel distribution, processor 8 locates horizontal spacers in the subsampled image (step 150). Horizontal spacers are sequential rows in the subsampled image that have fewer than a threshold number of active pixels. To reduce the processing required in subsequent processing steps, in a preferred embodiment, horizontal spacers are defined to be at least a group of two sequential rows (at 50 dpi) that do not have active pixels. If a group of sequential rows that do not have active pixels exceeds this predefined threshold, the group of horizontal row numbers are noted. Contemporaneously, processor 8 also locates a number of horizontal regions in the subsampled image (step 160). In a preferred embodiment, horizontal regions are the horizontal rows between horizontal spacers or are horizontal rows between a horizontal spacer and the top or bottom edge of the subsampled image. Based upon the horizontal spacers and horizontal regions located, the subsampled image is sectioned into a number N of sections (step 170).

Processor 8 next calculates a number N of preliminary vertical pixel distributions, one for each of the N sections of the subsampled image (step 180). In a preferred embodiment, a vertical pixel distribution is the sum of the number of active pixels in a vertical column, repeated for each vertical column in the section. The vertical pixel distribution is preferably stored as the number of active pixels in a column as a function of the vertical column number in each section.

Based upon the preliminary vertical pixel distribution, processor 8 locates vertical spacers in each of the N sections (step 190). Vertical spacers are sequential columns in the section that have fewer than a threshold number of active pixels. To reduce processing required in subsequent processing steps, in a preferred embodiment, vertical spacers are defined to be at least a group of two sequential columns (at 50 dpi) that do not have active pixels. If a group of sequential columns that do not have active pixels exceeds this predefined threshold, the group of vertical column numbers are stored. Contemporaneously, processor 8 also locates a number of vertical regions in each of the N sections (step 200). In a preferred embodiment, vertical regions are the vertical columns between vertical spacers or are vertical columns between a vertical spacer and the left or right edge of the section. Based upon the vertical spacers and vertical regions located for each of the N sections, the subsampled image is then re-sectioned into M number of sections (step 210).

Processor 8 next calculates a final horizontal pixel distribution for each of the M sections of the subsampled image (step 220). In a preferred embodiment, a final horizontal pixel distribution calculation is identical to the preliminary horizontal pixel distribution as described above except for the data that are processed. Based upon the final horizontal pixel distribution, processor 8 locates the horizontal spacers in each of the M sections (step 230) as described above. Processor 8 also locates horizontal regions in each of the M sections (step 240), as described above. Based upon the horizontal spacers and horizontal regions located for each of the M sections, the subsampled image is re-sectioned into a number P of sections (step 250).

Processor 8 next calculates a final vertical pixel distribution for each of the P sections of the subsampled image (step 260). In a preferred embodiment, a final vertical pixel distribution calculation is identical to the preliminary vertical pixel distribution as described above except for the data that are processed. Based upon the final vertical pixel distribution, processor 8 locates vertical spacers in each of the P sections (step 270) as described above. Further, processor 8 also locates vertical regions in each of the P sections (step 280), as described above. Based upon the vertical spacers and vertical regions located for each of the P sections, the subsampled image is re-sectioned into a number R of sections (step 290).

Based upon the vertical spacers and vertical regions located for each of the P sections, and the horizontal spacers and horizontal regions located for each of the M sections of the subsampled image, processor 8 locates coordinates for a top, bottom, left, and right edge for each of the R rectangles in the subsampled document (step 300). Rectangles typically locate distinct areas within the subsampled document which contain active pixels.

The coordinates for each of the R rectangles are then rescaled to a standard number of DPI (step 310). In a preferred embodiment the coordinates are scaled to 1200 DPI.

In the present embodiment of step 30 (segmenting the image into rectangles), as described above, four pixel distributions were sequentially performed: horizontal, vertical, horizontal, and then vertical. It should be understood that other sequential combinations of pixels distributions are contemplated, for example: vertical, horizontal, vertical, and horizontal. Limiting the number of pixel distributions to four was based upon performance considerations and experimentation. Adding more horizontal and vertical pixel distribution calculations to the preferred embodiment, in some cases may yield more accurate rectangle coordinates.

Figure 5:
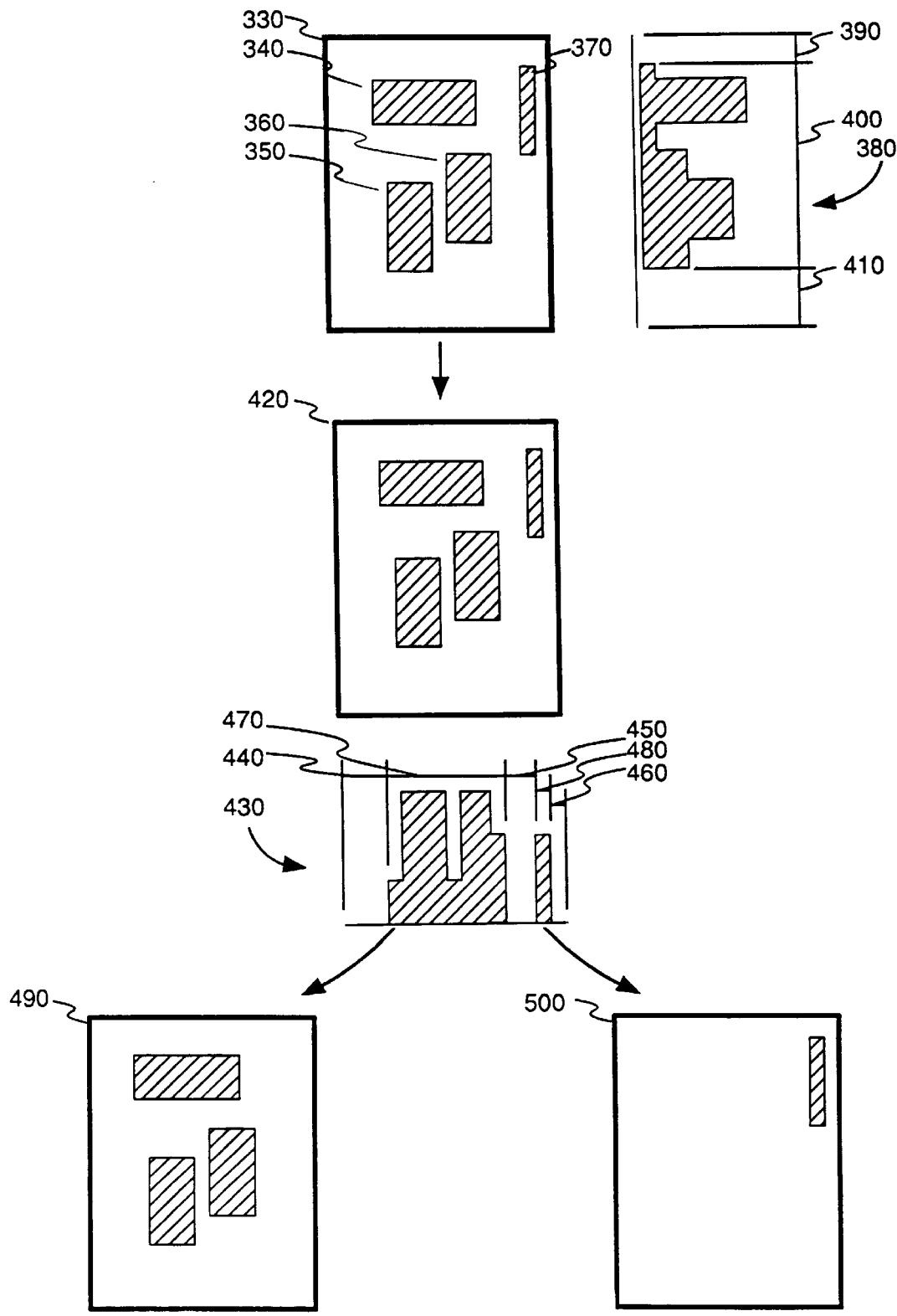
FIG. 5 illustrates the steps of calculating a preliminary horizontal pixel distribution and calculating a preliminary vertical pixel distribution.

FIGS. 5–8 illustrate an example of the preferred process of segmenting an image into rectangles. FIG. 5 illustrates the steps of calculating a preliminary horizontal pixel distribution and calculating a preliminary vertical pixel distribution. A subsampled image 330 contains areas with active pixels; these rectangles are block 340, block 350, block 360, and block 370. As described in step 140 of FIG. 3, processor 8 calculates a preliminary horizontal pixel distribution, illustrated as distribution 380 in FIG. 5. From distribution 380, processor 8 locates horizontal space 390, horizontal region 400, and horizontal space 410. Since there is only one horizontal region in subsampled image 330, subsampled image is not sectioned. The resulting image is labeled 420.

As described for step 180 of FIG. 3, processor 8 then calculates a preliminary vertical pixel distribution on image 420, illustrated as distribution 430 in FIG. 5. From distribution 430, the processor locates vertical spaces 440, 450, and 460, and vertical regions 470 and 480. Since there are two (M=2) discrete vertical regions (470 and 480), image 420 is re-sectioned into two sections, as illustrated by section 490 and section 500.

Figure 6:
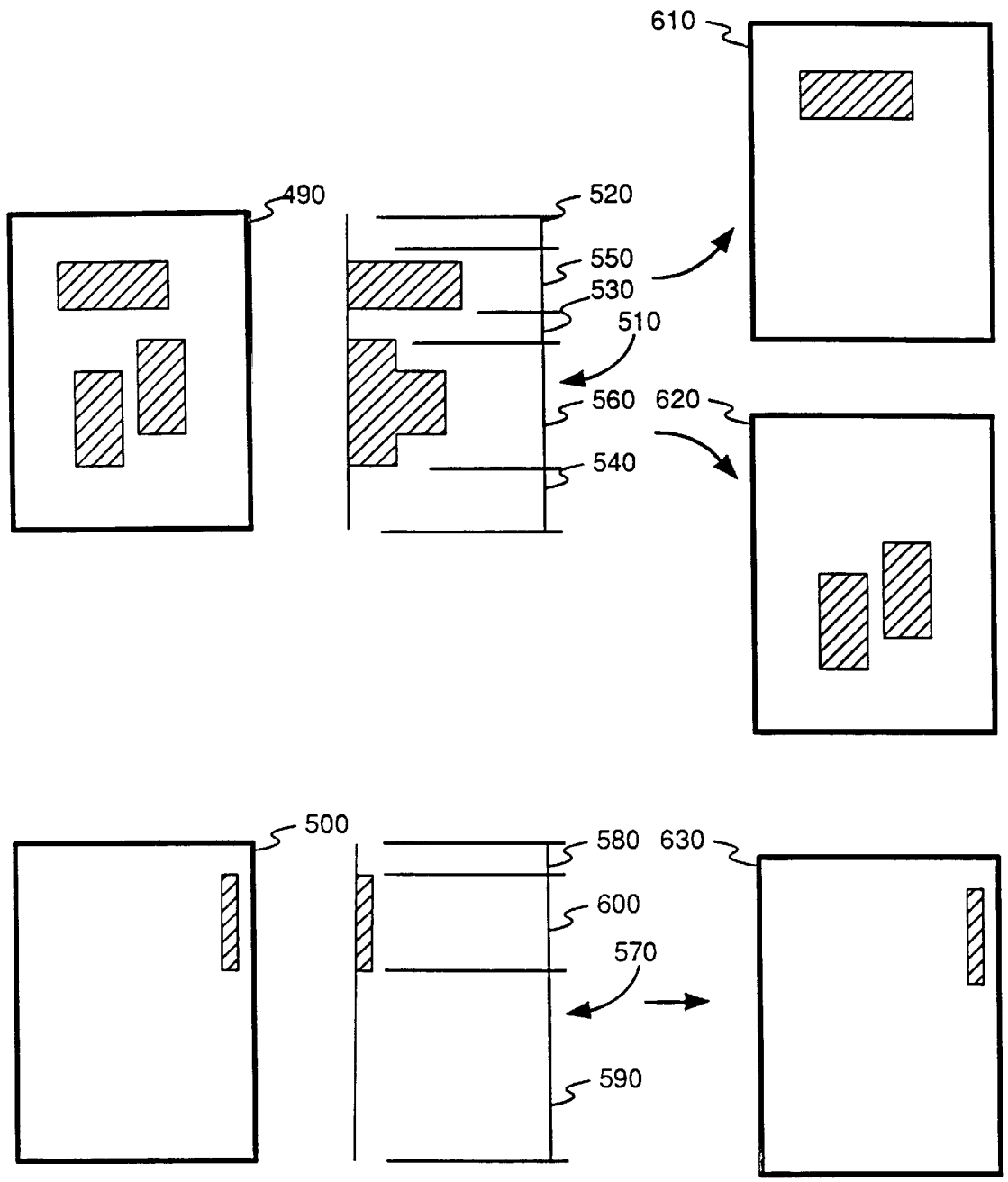
FIG. 6 illustrates the steps of calculating a final horizontal pixel distribution.

FIG. 6 illustrates the steps of calculating final horizontal pixel distributions for section 490 and section 500. For section 490 a final horizontal pixel distribution is calculated and illustrated as distribution 510. From distribution 510, processor 8 locates horizontal spaces 520, 530, and 540, and horizontal regions 550 and 560. For section 500 a final horizontal pixel distribution is calculated and illustrated as distribution 570. From distribution 570, processor 8 locates horizontal spaces 580 and 590 and horizontal region 600. Since there are three (P=3) discreet horizontal regions (550, 560, and 600), image 490 is resectioned into two sections, and image 500 is not sectioned. The resulting images are labeled 610, 620, and 630, respectively.

Figure 7:
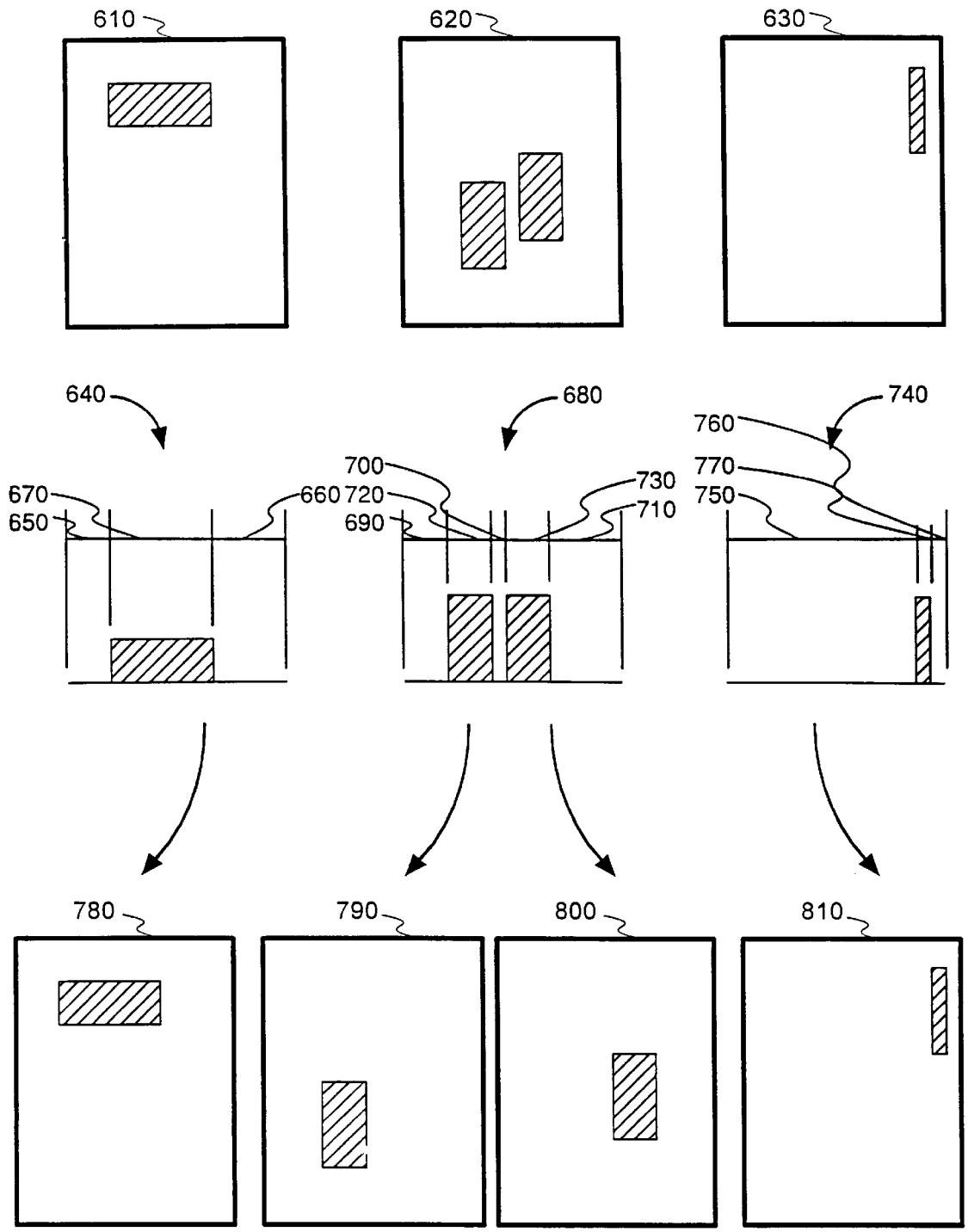
FIG. 7 illustrates the steps of calculating a final vertical pixel distribution.

FIG. 7 illustrates the steps of calculating a final vertical pixel distributions for sections 610, 620, and 630. For section 610 a final vertical pixel distribution is calculated, and illustrated as distribution 640. From distribution 640, processor 8 locates vertical spaces 650 and 660, and vertical region 670. For section 620 a final vertical pixel distribution is calculated, and illustrated here as distribution 680. From distribution 680, processor 8 locates vertical spaces 690, 700, and 710, and vertical regions 720 and 730. For section 630 a final vertical pixel distribution is calculated, and illustrated here as distribution 740. From distribution 740, processor 8 locates vertical spaces 750 and 760 and vertical regions 770. Since there are four (R=4) discreet vertical regions (670, 720, 730, and 770), image 610 is not sectioned, image 620 is resectioned into two sections as illustrate by section 720 and 730, and image 630 is not sectioned. The resulting images are labeled, 780, 790, 800, and 810.

Figure 8:
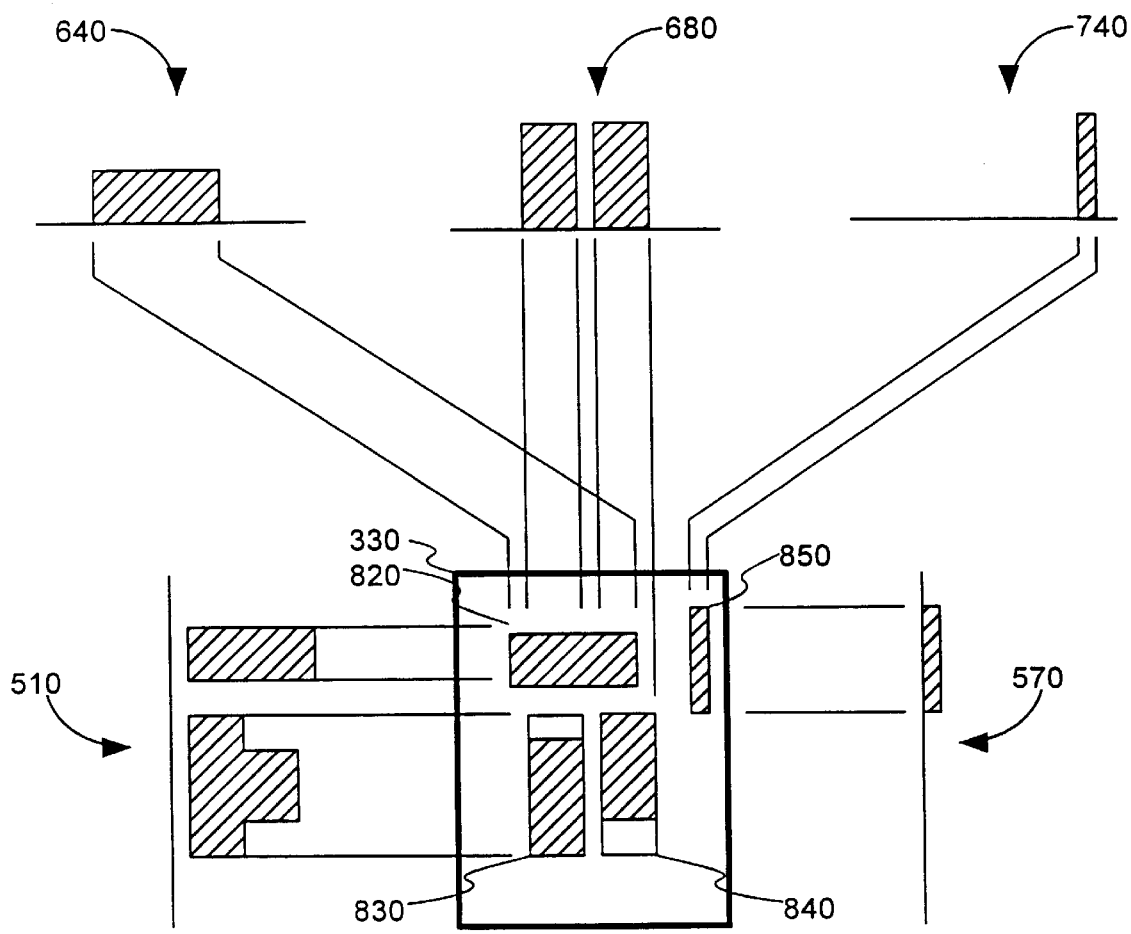
FIG. 8 illustrates the process of locating coordinates for the rectangles on a sub-sampled document.

FIG. 8 illustrates the process of locating coordinates for the rectangles on sub-sampled document 330. The processor determines the top and bottom coordinates for rectangle 820 on sub-sampled document 330 from image 510 and the left and right coordinates from image 640. Similarly, the processor determines the top and bottom coordinates for rectangle 830 from image 510 and the left and right coordinates from image 680. The processor determines the top and bottom coordinates for rectangle 840 from image 510 and the left and right coordinates from image 680. Finally the processor determines the top and bottom coordinates for rectangle 850 from image 570 and the left and right coordinates from image 740.

Figure 9:
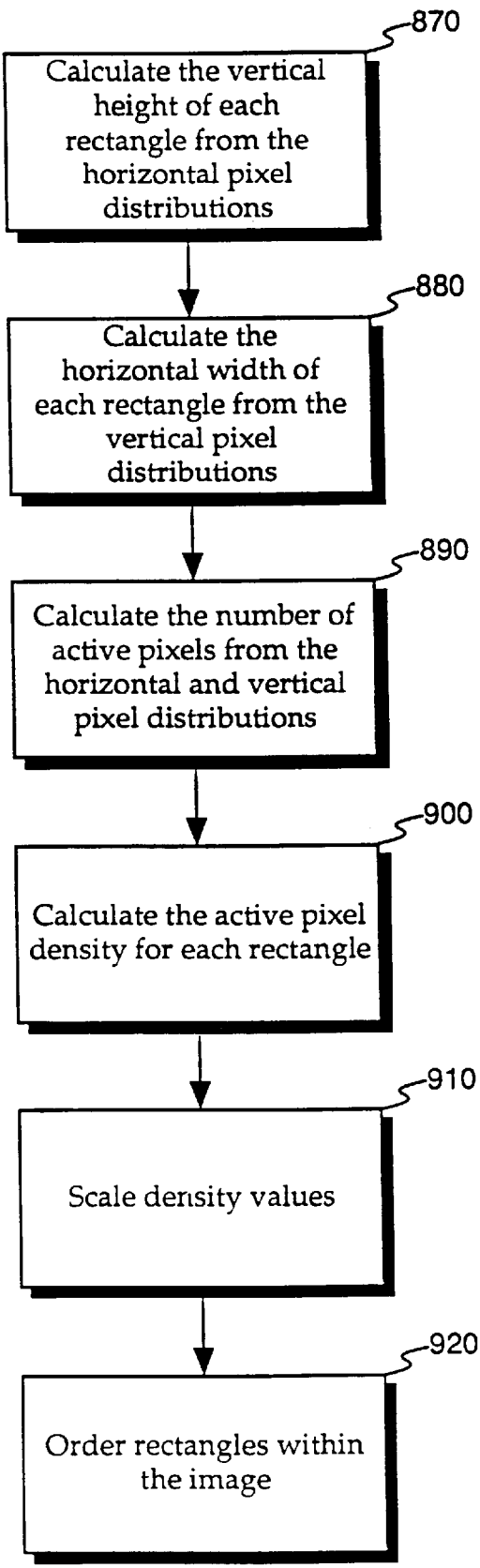
FIG. 9 is an expanded flow diagram illustrating the steps within the step of determining rectangle density and ordering of rectangles on the image.

FIG. 9 is an expanded flow diagram illustrating the steps within step 40 (determining rectangle density and ordering of rectangles on the image). For each rectangle located in the image, the vertical height of the rectangle is calculated from the top and bottom coordinates (step 870) and the horizontal width of the rectangle is calculated from the left and right coordinates (step 880). The number of active pixels within each rectangle is calculated based upon the horizontal and/or vertical pixel distribution for each rectangle, (step 890). Based upon the vertical height, horizontal width, and number of active pixels within each rectangle, the active pixel density for each rectangle is calculated (step 900). The values for each density are then scaled, in a preferred embodiment, from a value of zero to 1000 (step 910). After the rectangle densities have been calculated, processor 8 orders the rectangles, in a preferred embodiment based upon the location of the top left corner of the rectangle (step 920).

Figure 10:
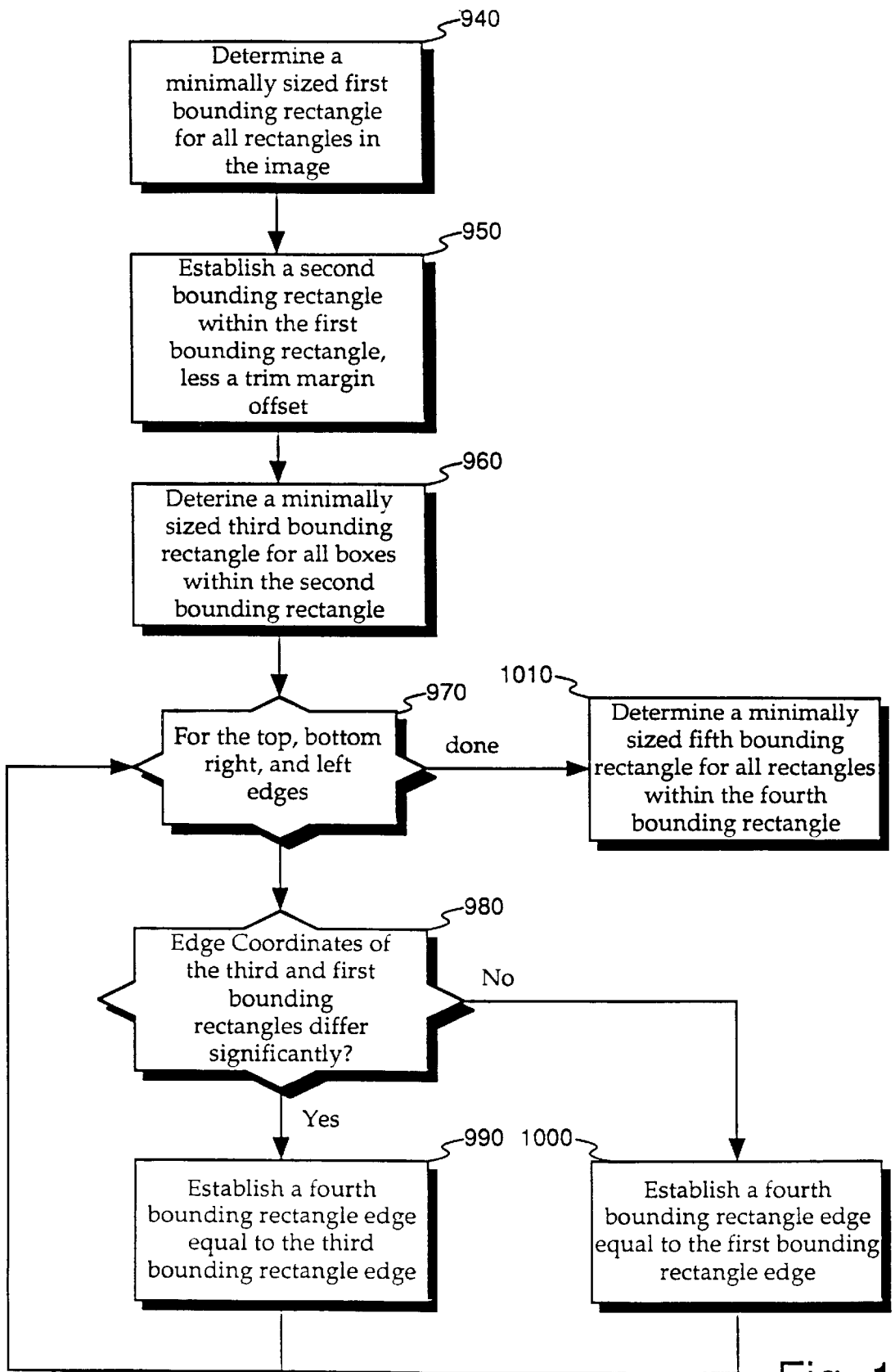
FIG. 10 is an expanded flow diagram illustrating the steps within the step of determining a bounding rectangle for the rectangles in the image.

FIG. 10 is an expanded flow diagram illustrating the steps within step 50 (determining a bounding rectangle for the rectangles in the image). Processor 8 determines the size of a first bounding rectangle in step 940. The first bounding rectangle is a minimally sized rectangle which bounds each of the rectangles located in the previous steps. In a preferred embodiment, processor 8 determines a minimally sized first bounding rectangle that is just large enough to bound each of the located rectangles. The first bounding rectangle is based upon the preliminary horizontal and vertical pixel distribution or based upon the coordinates of the located rectangles. The first bounding rectangle may be used as the bounding rectangle for step 50. In a preferred embodiment, however, processor 8 filters the first bounding rectangle before determining the bounding rectangle used in step 50.

One type of filter, edge-trimming filter, is illustrated in steps 950–1010. After the first bounding rectangle is determined, processor 8 estimates a second bounding rectangle within the first bounding rectangle, less a trim margin offset on all sides of rectangle (step 950). In a preferred embodiment, the trim margin offset is 0.5 inch. Processor 8 then determines if there are any rectangles entirely outside of the second bounding rectangle, and determines a minimally sized third bounding rectangle which bounds all the rectangles except those rectangles entirely outside the second bounding rectangle (step 960). Next, for the top, bottom, left, and right edge of the first and third bounding rectangles (step 970), processor 8 determines whether edge of the first bounding rectangle and the third bounding rectangle are "significantly different". The respective edges of the first and third bounding rectangle are "significantly different" in a preferred embodiment, if the distance exceeds 1.5 inches. If the respective edges are significantly different, an edge of an established fourth bounding rectangle is set equal to the third bounding rectangle edge (step 990). If the respective edges are not significantly different, the edge of the fourth bounding rectangle is set equal to the first bounding rectangle edge (step 1000).

Finally, using the techniques described above, processor 8 determines the size of a fifth bounding rectangle in step 1010. The fifth bounding rectangle is a minimally sized rectangle which bounds all of the rectangles located in the fourth bounding rectangle. In a preferred embodiment, processor 8 determines a minimally sized fifth bounding rectangle that is just large enough to bound each of the rectangles located in the fourth bounding rectangle, and determines the top-left coordinate, width, and height of the fifth bounding rectangle.

FIGS. 11 A–H illustrate an example of the preferred process of determining a bounding rectangle for rectangles 820, 830, 840, and 850 in FIG. 8. In FIG. 11A, rectangles 820, 830, 840, and 850 for the image as shown. In FIG. 11B, a minimally sized first bounding rectangle 1030 is determined, according to step 940. First bounding rectangle 1030 includes top edge 1032 and a right edge 1034. In FIG. 11C, the second bounding rectangle 1040 is determined based upon the first bounding rectangle less a trim margin, according to step 950. In FIG. 11D, a minimally sized third bounding rectangle 1050 is determined, excluding rectangle 850 which is outside the second bounding rectangle, according to step 960. Third bounding rectangle 1050 includes top edge 1052 and right edge 1054.

In FIG. 11E, both third bounding rectangle 1050 and first bounding rectangle 1030 are illustrated. FIG. 11F illustrates a fourth bounding rectangle 1060. The top edge 1062 of fourth bounding rectangle 1060 is set equal to top edge 1032, when top edge 1032 and top edge 1053 do not have a "significant difference," according to step 1000. This is repeated for the left and the bottom edge of fourth bounding rectangle 1060. The right edge 1064 of fourth bounding rectangle 1060 is set equal to right edge 1054, when right edge 1034 and right edge 1054 have a "significant difference", according to step 990.

In FIG. 11G, a minimally sized fifth bounding rectangle 1070 is determined, according to step 1010. Fifth bounding rectangle contains top edge 1072. In the first bounding rectangle 1030, top edge 1032 was located at the top of rectangle 850. Top edge 1032 later became top edge 1062 of fourth bounding rectangle 1060. However, because rectangle 850 was "trimmed out" of third bounding rectangle 1050, top edge 1062 is not a minimally sized bounding edge for rectangles 820, 830, and 840. Fifth bounding rectangle 1070 is thus required and determined based only upon rectangles 820, 830 and 840. FIG. 11H illustrates fifth bounding rectangle 1070 in relation to the image. The coordinates of the top-left corner 1080, the horizontal width 1082 and the vertical height 1084 are determined in the same manner as with the located rectangles in FIG. 9.

Figure 12:
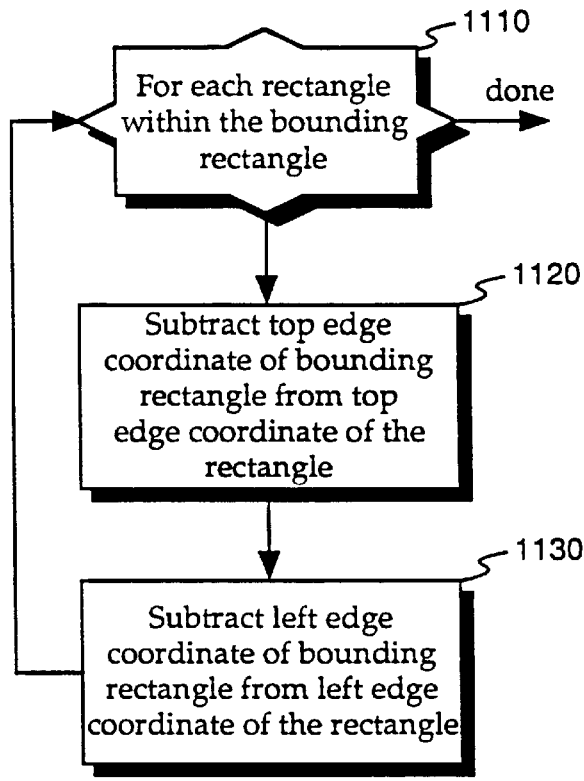
FIG. 12 is an expanded flow diagram illustrating the steps within the step of determining the position of the rectangles relative to the bounding rectangle.

FIG. 12 is an expanded flow diagram illustrating the steps within step 60 (determining the position of the rectangles relative to the bounding rectangle). In a preferred embodiment, for each rectangle previously located (step 1100), the top edge coordinate for the rectangle is subtracted from the top edge coordinate for the bounding rectangle (step 1110). Similarly the left edge coordinate for the rectangle is subtracted from the left edge coordinate for the bounding rectangle (step 1120). In a preferred embodiment, the above steps are used to "normalize" the position of the rectangles on the image for comparison purposes. Of course, other ways to normalize the position of the rectangles to the image may also be employed.

Figure 13:
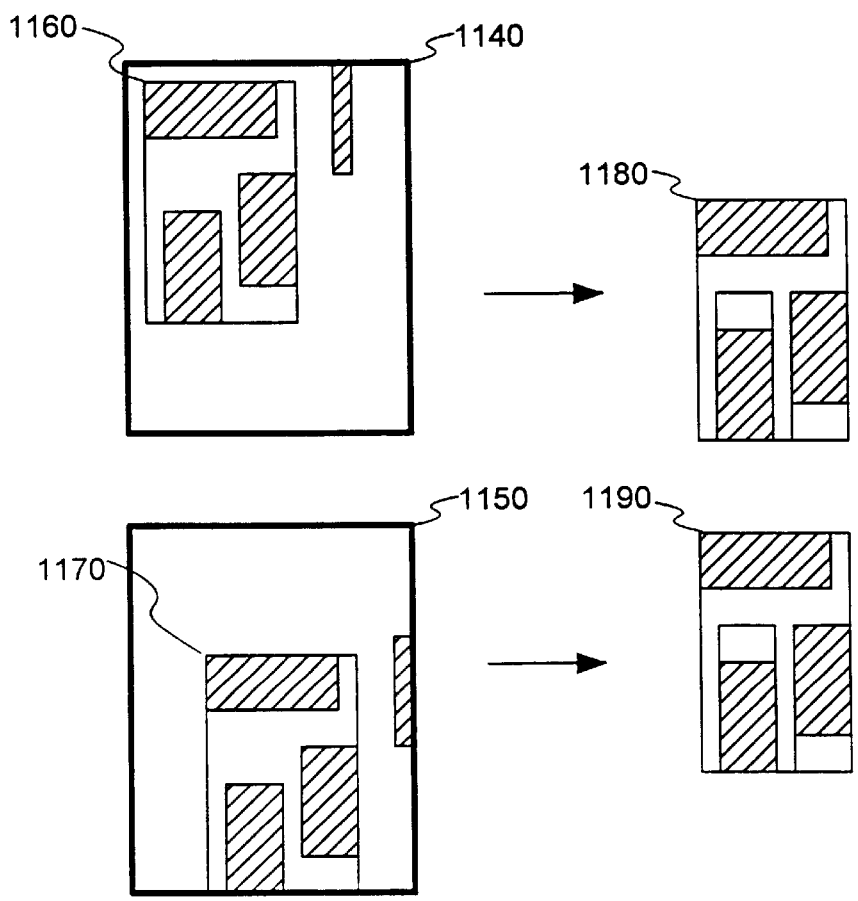
FIG. 13 illustrates an example of normalizing the position of the rectangles in an image.

FIG. 13 illustrates an example of normalizing the position of the rectangles in an image. Image 1140 and image 1150 are two images of the same document (not shown). The difference between the two images is that in image 1150 there is a larger left and top margin. The differences in the margins can be due to the operator placing the document in a different position on a scanner, for example. After the processing steps 30–50, it can be seen the bounding rectangle 1160 for image 1140 and the bounding rectangle 1170 for image 1150 will have different top-left coordinates. By "normalizing" the coordinates for rectangles relative to the bounding rectangle as illustrated in image 1180 and 1190, it can be seen that the rectangles are located in a relatively fixed position with respect to the respective bounding rectangle, even though the rectangles are not constant with respect to the image. Normalizing the location of the rectangles facilitates comparing the document to other documents.

After normalizing the position of the rectangles relative to the bounding rectangle, an image vector of the image is calculated. In a preferred embodiment, the image vector includes the horizontal and vertical size of the bounding rectangle, and for each rectangle within the bounding rectangle, the top and left coordinates (normalized) of the rectangle, the horizontal and vertical size of the rectangle, and the active pixel density of the rectangle.

Figure 14:
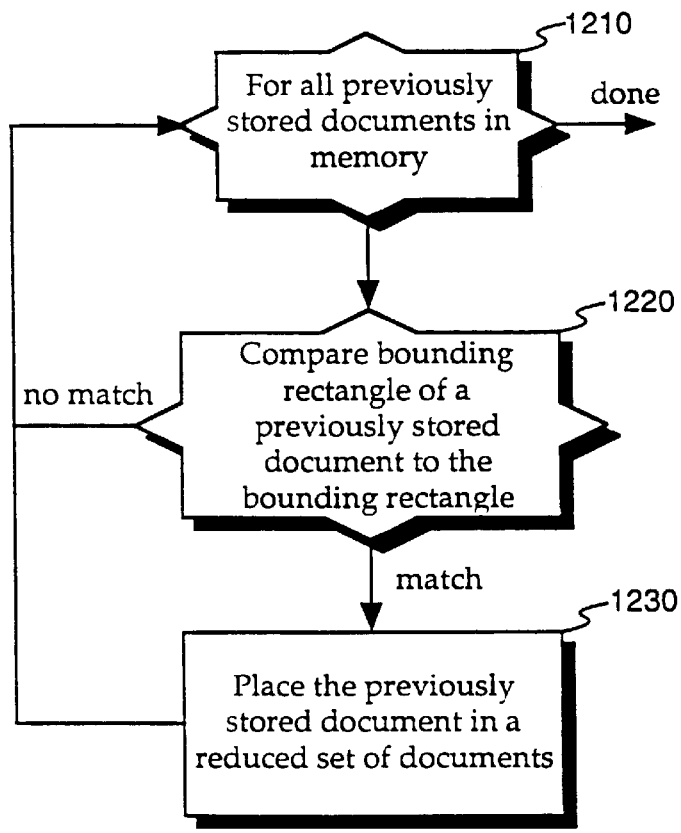
FIG. 14 is an expanded flow diagram illustrating the steps within the step of determining a reduced set of documents.

FIG. 14 is an expanded flow diagram illustrating the steps within step 80 (determining a reduced set of documents). For each previously stored document (step 1210), processor 8 compares the horizontal and vertical sizes of a bounding rectangle of a previously stored document to the bounding rectangle of the document (1220). If the bounding rectangle of the previously stored document does not match the bounding rectangle (of the new image) within a threshold, no more comparisons with the previously stored document are required. If the bounding rectangle of the previously stored document matches the bounding rectangle (of the new image) within the threshold, the previously stored document feature vector is placed in a reduced set of documents for further comparison purposes (step 1230). In a preferred embodiment, (for an image scaled to 1200 DPI) the threshold comparison used is if the horizontal and vertical size of the bounding rectangles are each within 450 dots.

Figure 15:
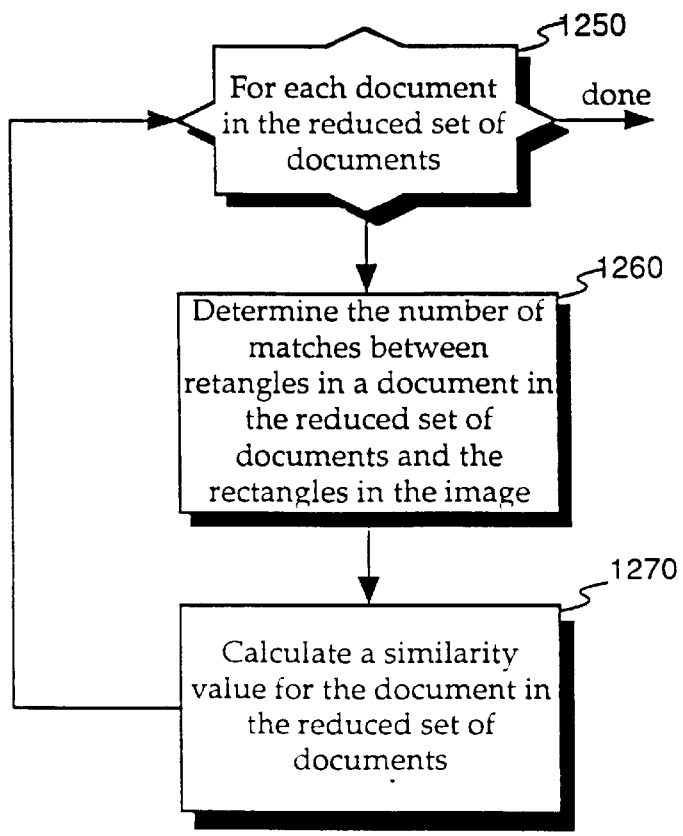
FIG. 15 is an expanded flow diagram illustration of the steps within the step of comparing rectangles in a document.

FIG. 15 is an expanded flow diagram illustration of the steps within step 90 (comparing rectangles in a document). For each document in the reduced document set (step 1250), processor 8 determines whether any rectangles within the previously stored document match any rectangles of the new image, within a threshold and if so how many match (step 1260). Based upon the number of rectangle matches, a "similarity" value is calculated for the previously stored document (step 1270).

In a preferred embodiment, (for an image scaled to 1200 DPI) the threshold comparison used is to determine if the top and left edge coordinates and the horizontal and vertical sizes of the rectsizes of the rectangles are each within 450 dots of eachother. Further, the threshold comparison used for the rectangle density is whether the densities are within 50% of each other. In the situation where there is a low pixel density, in a preferred embodiment, an absolute threshold is used instead of the 50% value.

Based upon experimental data, the "similarity" value for each document is based upon equation (1).

$$\text{Similarity} = \text{SizeSimilarityPoints} + \text{(NumMatchingRegions} \times \text{(RegionIntersectionBasePoints} + \text{(PointMultiplier} \times \text{(NumMatchingRegions/NumNewDocRegions))))} \quad (1)$$

In equation (1), NumMatchingRegions is a variable based upon the number of rectangles matched between a previously stored document and a new document, and NumNewDocRegions is a variable based upon the total number of rectangles in the new document. In a preferred embodiment, the maximum number of rectangles on a document is limited to 200. Also in a preferred embodiment the values for the following constants were experimentally determined: SizeSimilarityPoints=30, RegionIntersectionBasePoints= 10, and PointsMultiplier=10.

FIG. 16 is an expanded flow diagram illustrating the steps within step 100 (returning a list of potential document type matches). After the "similarity" value for each of the reduced set of document is calculated, processor 8 calculates a "similarity" value for each folder that has at least one document within the set of reduced documents (step 1290). In a preferred embodiment, the similarity value for each folder is simply the summation of the similarity values (calculated in step 90) of all documents in the folder.

Next, folders not having a similarity value exceeding an absolute threshold are removed from further consideration (step 1300). In a preferred embodiment, the summation of similarity values for each folder must exceed a value of 100 points to meet the threshold. The remaining folders must then have a similarity value within a relative threshold to each other as calculated in step 1310. In a preferred embodiment, the folder having the highest similarity value is first identified. The highest similarity value is them multiplied by 40%, in a preferred embodiment. Then, any folders not having a similarity value greater than the 40% value are removed from further consideration. The second threshold is used to eliminate folder suggestions when there are folders with a very high similarity value. Finally, the remaining folders are returned to the user as potential document type matches (step 1320). In a preferred embodiment, the three top scoring folders are suggested to the user.

In response to the suggestions, the user can select one of the suggested potential document types for the document. After the user selection, processor 8 performs a task associated with the selected document type (step 110).

In one embodiment, the task performed by processor 8 is to store the document in the user selected folder, and to store the document feature vector along with the other existing feature vectors.

In another embodiment, the task performed by processor 8 is to automatically route or disseminate the document to destinations associated with the document type. For example, if a document is identified as an "invoice", and the task associated with the document type "invoice" is to mail an electronic copy of the document to accounts payable, processor 8 will automatically mail the document to accounts payable as soon as the document is identified as an "invoice."

In another embodiment, the task performed by processor 8 is to automatically execute an application program associated with the document type. For example, if a document is identified as a "graphic", and the task associated with the document type "graphic" is to run a graphics program and open the document, processor 8 will automatically run the graphics program and open the document as soon the document is identified as a "graphic."

In yet another embodiment, the task performed by processor 8 is to automatically schedule archiving or deletion for the document type. For example, if a document is identified as a "weekly status report" processor 8 will automatically delete the document after the week has elapsed.

FIG. 17 is a flow diagram illustrating a method of locating a previously stored document. A user scans a document into computer memory that is similar in type to the previously stored (step 1340). For example, a user can scan a copy of a blank non-disclosure agreement into the computer, for the purpose of locating where completed non-disclosure agreements are kept. Processor 8 calculates a feature vector for the scanned document (step 1350), and then compares feature vectors of previously stored documents to the feature vector (step 1360). Based upon the closest matches the processor locates suggested folders where the document might be found (step 1370). In response to the user selection, processor 8 displays the contents of each of the suggested folders. The user is thus quickly and automatically directed to locations where the document is most likely stored.

In the foregoing specification, the invention has been described with reference to a specific exemplary embodiments thereof. Many changes or modifications are readily envisioned. For example, changing the method of reducing the number of previously stored documents the processor searches through, using color or grey scale images instead of black and white, changing the method and or the constants used in scoring rectangle similarity or folder similarity, changing the thresholds used in matching rectangles or folders, executing other tasks associated with the document type such as dissemination of the document to a software module appropriate for the document type, are included within other embodiments of the present invention.

The specification and drawings are, accordingly, to be regarded in an illustrative rather than in a restrictive sense. It will, however, be evident that various modifications and changes may be made thereunto without departing from the broader spirit and scope of the invention as set forth in the claims.

What is claimed is:

1. A method for automatic handling of a document in a computer system, the computer system including a processor and a memory, the method including the steps of:
    retrieving a digitized image of a document from the memory, the digitized image of the document including images of a plurality of textual characters;
    calculating an indicia of the document with the processor in response to the digitized image; and
    performing a task on the digitized image based upon the indicia.

2. The method of claim 1, wherein the step of performing the task comprises the step of filing the digitized image in the memory based upon the indicia.

3. The method of claim 1, wherein the step of performing the task comprises the step of executing a routine appropriate for the digitized image based upon the indicia.

4. The method of claim 1, further comprising the step of digitizing the document with a digitizer to form the digitized image.

5. The method of claim 1, wherein the digitized image also includes a graphical image.

6. The method of claim 1, wherein the digitized image includes colors, and
    wherein the step of calculating the indicia comprises the step of calculating the indicia of the document with the processor in response to the colors of the digitized image.

7. A method for automatic handling of a document in a computer system, the computer system including a processor, and a memory, the method including the steps of:
    retrieving a digitized image of the document from the memory, the digitized image of the document including images of a plurality of textual characters;
    determining a feature vector for the digitized image with the processor;
    determining a document type for the document in response to the feature vector; and
    performing a task on the digitized image appropriate for the document type.

8. The method of claim 7, wherein the memory is non-volatile memory.

9. The method of claim 7, wherein the step of determining the document type comprises the steps of:
    comparing feature vectors of a plurality of previously stored images to the feature vector; and
    displaying a list of filing locations in the memory having at least one of said plurality of previously stored documents with a feature vector similar to said feature vector.

10. The method of claim 7, wherein the step of performing the task comprises storing the digitized image in a selected location in the memory.

11. The method of claim 7, further comprising the step of:
    digitizing the document with a scanner to form the digitized image.

12. The method of claim 7, wherein the digitized image of the document also comprises a graphic image.

13. The method of claim 7, wherein the step of performing the task comprises the step of running an application program on the digitized image of the document.

14. A computer system for managing a document, the computer system comprising:
    code that directs a processor to retrieve a digitized image of the document, the digitized image of document including images of a plurality of textual characters;
    code that directs the processor to calculate an indicia of the document in response to the digitized image; and
    code that directs the processor to perform a task on the digitized image in response to the indicia;
    wherein the codes reside on a computer-readable memory.

15. The computer system of claim 14 wherein the code that directs the processor to perform a task comprises code that directs the processor to file the digitized image in the computer-readable memory in response to the indicia.

16. The computer system of claim 14 wherein the code that directs the processor to perform a task comprises code that directs the processor to execute a routine appropriate for the digitized image in response to the indicia.

17. The computer system of claim 14 wherein the computer-readable memory also includes code that directs the processor to digitize the document with a digitizer to form the digitized image.

18. The computer system of claim 14, wherein the document also includes an image.

19. The computer system of claim 14, wherein the digitized image includes colors, and
    wherein the code that directs the processor to calculate the indicia comprises code that directs the processor to calculate the indicia in response to the colors of the digitized image.

20. A computer program product for automatic filing of a document in the computer system, comprising:
    code that directs the processor to determine a position and a size for a plurality of regions in the document;
    code that directs the processor to compare the position and the size for the plurality of regions in the document to positions and sizes for regions in a plurality of previously stored documents; and
    code that directs the processor to store the document in a filing location in the computer system along with a previously stored document having regions having similar positions and similar sizes to the position and the size for the plurality of regions in the document;wherein the codes reside on a computer-readable memory.

21. The computer program product of claim 20 wherein the computer-readable memory also includes code that directs the processor to capture the document with an input device.

22. The computer program product of claim 20 wherein the computer-readable memory also includes code that directs the processor to retrieve the document from the computer-readable memory.

23. The computer program product of claim 20 wherein the computer-readable memory also includes code that directs the processor to execute a task on the document appropriate for documents in the filing location.

* * * * *